US012223627B2

(12) United States Patent
Alakuijala et al.

(10) Patent No.: US 12,223,627 B2
(45) Date of Patent: Feb. 11, 2025

(54) OVERSMOOTHING PROGRESSIVE IMAGES

(71) Applicant: Google LLC, Mountain View, CA (US)

(72) Inventors: Jyrki Antero Alakuijala, Wollerau (CH); Moritz Firsching, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/760,076

(22) PCT Filed: Apr. 27, 2021

(86) PCT No.: PCT/US2021/070464
§ 371 (c)(1),
(2) Date: Aug. 3, 2022

(87) PCT Pub. No.: WO2022/026966
PCT Pub. Date: Feb. 3, 2022

(65) Prior Publication Data
US 2023/0061045 A1 Mar. 2, 2023

Related U.S. Application Data

(60) Provisional application No. 62/706,055, filed on Jul. 29, 2020.

(51) Int. Cl.
*G06T 5/70* (2024.01)
*G06F 3/14* (2006.01)
(Continued)

(52) U.S. Cl.
CPC .............. *G06T 5/70* (2024.01); *G06F 3/14* (2013.01); *G06T 5/20* (2013.01); *G06T 5/50* (2013.01)

(58) Field of Classification Search
CPC ... G06T 5/002; G06T 5/20; G06T 5/50; G06F 3/14; H04N 19/117; H04N 19/18; H04N 19/33; H04N 19/187
See application file for complete search history.

(56) References Cited

U.S. PATENT DOCUMENTS 7,127,453 B1 * 10/2006 Frazier ................ G06F 16/9577
10,217,195 B1 * 2/2019 Agrawal ................... G06T 7/11
(Continued)

FOREIGN PATENT DOCUMENTS

| JP | 2002528969 A | 9/2002 |
| JP | 2008517540 A | 5/2008 |
| WO | 2006052390 A2 | 5/2006 |

OTHER PUBLICATIONS

International Search Report and Written Opinion for PCT Application No. PCT/US2021/070464, mailed on Jul. 20, 2021, 11 pages.
(Continued)

*Primary Examiner* — Said Broome
*Assistant Examiner* — Donna J. Ricks
(74) *Attorney, Agent, or Firm* — Brake Hughes Bellermann LLP

(57) ABSTRACT

A technique for improving progressive encoded JPEG includes displaying an oversmoothed version of an image as the image data is being received. The oversmoothed image may be smoothed according to a smoothing kernel, e.g., a convolution kernel (such as a Gaussian). The oversmoothed image is a first layer over which other image layers are displayed. It is noted that the oversmoothed image may present a recognizable version of the image to a user, including recognizable versions of various image features (e.g., persons, objects). As the other layers are rendered on the display, these image features remain visible to the user. That is, the image features are not artifacts that may disappear with the rendering of final image layers; this may occur with the conventional progressive encoded images and interferes with the user experience.

22 Claims, 3 Drawing Sheets

(51) Int. Cl.
*G06T 5/20* (2006.01)
*G06T 5/50* (2006.01)

(56) References Cited

U.S. PATENT DOCUMENTS

| | | | | |
|---|---|---|---|---|
| 2002/0196369 | A1* | 12/2002 | Rieder | H04N 21/4316 348/565 |
| 2011/0169823 | A1* | 7/2011 | Barenburg | G06T 15/205 345/419 |
| 2013/0050253 | A1* | 2/2013 | Jooste | G06F 16/9577 345/629 |
| 2015/0213632 | A1* | 7/2015 | Trask | G06T 15/80 345/426 |
| 2020/0302664 | A1* | 9/2020 | Lee | G06T 11/001 |
| 2022/0020132 | A1* | 1/2022 | Kondrad | G06T 5/002 |

OTHER PUBLICATIONS

Li, et al., "Layered DCT Still Image Compression", IEEE Transaction On Circuits and Systems for Video Technology, vol. 7, No. 2, Apr. 1997, pp. 440-443.
Office Action for Japanese Application No. 2022-569240 (with English Translation), mailed Jan. 16, 2024, 13 pages.

\* cited by examiner

OVERSMOOTHING PROGRESSIVE IMAGES

CROSS-REFERENCE TO RELATED APPLICATIONS

This application is a 35 U.S.C. § 371 National Phase Entry Application from PCT/US2021/070464, filed on Apr. 27, 2021, entitled "OVERSMOOTHING PROGRESSIVE IMAGES", which claims the benefit of U.S. Provisional Patent Application No. 62/706,055, filed on Jul. 29, 2020, entitled "OVERSMOOTHING PROGRESSIVE IMAGES", the disclosures of which are incorporated herein by reference in their entirety.

TECHNICAL FIELD

This description relates to displaying progressive encoded images (e.g., progressive JPEG) as the progressive images are received by a client computer.

BACKGROUND

In a non-progressive JPEG, image data is organized in such a way that the resulting image is rendered line by line on a display, going from top to bottom. In a progressive JPEG, that image data is organized in such a way that the resulting image is rendered in multiple scans, each scan providing increasingly more information about the image.

SUMMARY

Implementations provide a scheme to display progressive encoded images using oversmoothing. Conventionally, progressive encoded images are displayed without smoothing. Nevertheless, rendering an oversmoothed image on a display and then rendering subsequent image layers over the oversmoothed image may be less disruptive to a user than a display of a final image on, e.g., a white background. The oversmoothed image may be smoothed according to a smoothing kernel, e.g., a convolution kernel (such as a Gaussian). The oversmoothed image is a first layer over which other image layers are displayed. It is noted that the oversmoothed image may present a recognizable version of the image to a user, including recognizable versions of various image features (e.g., persons, objects). As the other layers are rendered on the display, these image features remain visible to the user. That is, the image features are not artifacts that may disappear with the rendering of final image layers; this may occur with the conventional progressive encoded images and interferes with the user experience.

In one general aspect, a method can include transmitting, from a client, a request to access image data representing an image. The method can also include, after transmitting the request, receiving a first portion of the image data, the first portion of the image data representing a first image layer, the first layer including a first set of features. The method can further include rendering, as the first layer, an oversmoothed version of the image on a display associated with the client, the oversmoothed version of the image including more than one color. The method can further include, after receiving the first portion of the image data to the client, receiving a second portion of the image data, the second portion of the image data representing a set of additional image layers. The method can further include rendering the set of additional image layers on the display while displaying the first set of features of the first layer on the display.

In another general aspect, a computer program product comprises a non-transitory storage medium, the computer program product including code that, when executed by processing circuitry of a computing device, causes the processing circuitry to perform a method. The method can include transmitting, from a client, a request to access image data representing an image. The method can also include, after transmitting the request, receiving a first portion of the image data, the first portion of the image data representing a first image layer, the first layer including a first set of features. The method can further include rendering, as the first layer, an oversmoothed version of the image on a display associated with the client, the oversmoothed version of the image including more than one color. The method can further include, after receiving the first portion of the image data to the client, receiving a second portion of the image data, the second portion of the image data representing a set of additional image layers. The method can further include rendering the set of additional image layers on the display while displaying the first set of features of the first layer on the display.

In another general aspect, an electronic apparatus configured to generate a recrawling policy comprises memory and controlling circuitry coupled to the memory. The controlling circuitry can be configured to transmit, from a client, a request to access image data representing an image. The controlling circuitry can also be configured to, after transmitting the request, receive a first portion of the image data, the first portion of the image data representing a first image layer, the first layer including a first set of features. The controlling circuitry can also be configured to render, as the first layer, an oversmoothed version of the image on a display associated with the client, the oversmoothed version of the image including more than one color. The controlling circuitry can also be configured to, after receiving the first portion of the image data to the client, receive a second portion of the image data, the second portion of the image data representing a set of additional image layers. The controlling circuitry can also be configured to render the set of additional image layers on the display while displaying the first set of features of the first layer on the display The details of one or more implementations are set forth in the accompanying drawings and the description below. Other features will be apparent from the description and drawings, and from the claims.

DETAILED DESCRIPTION

Figure 1:
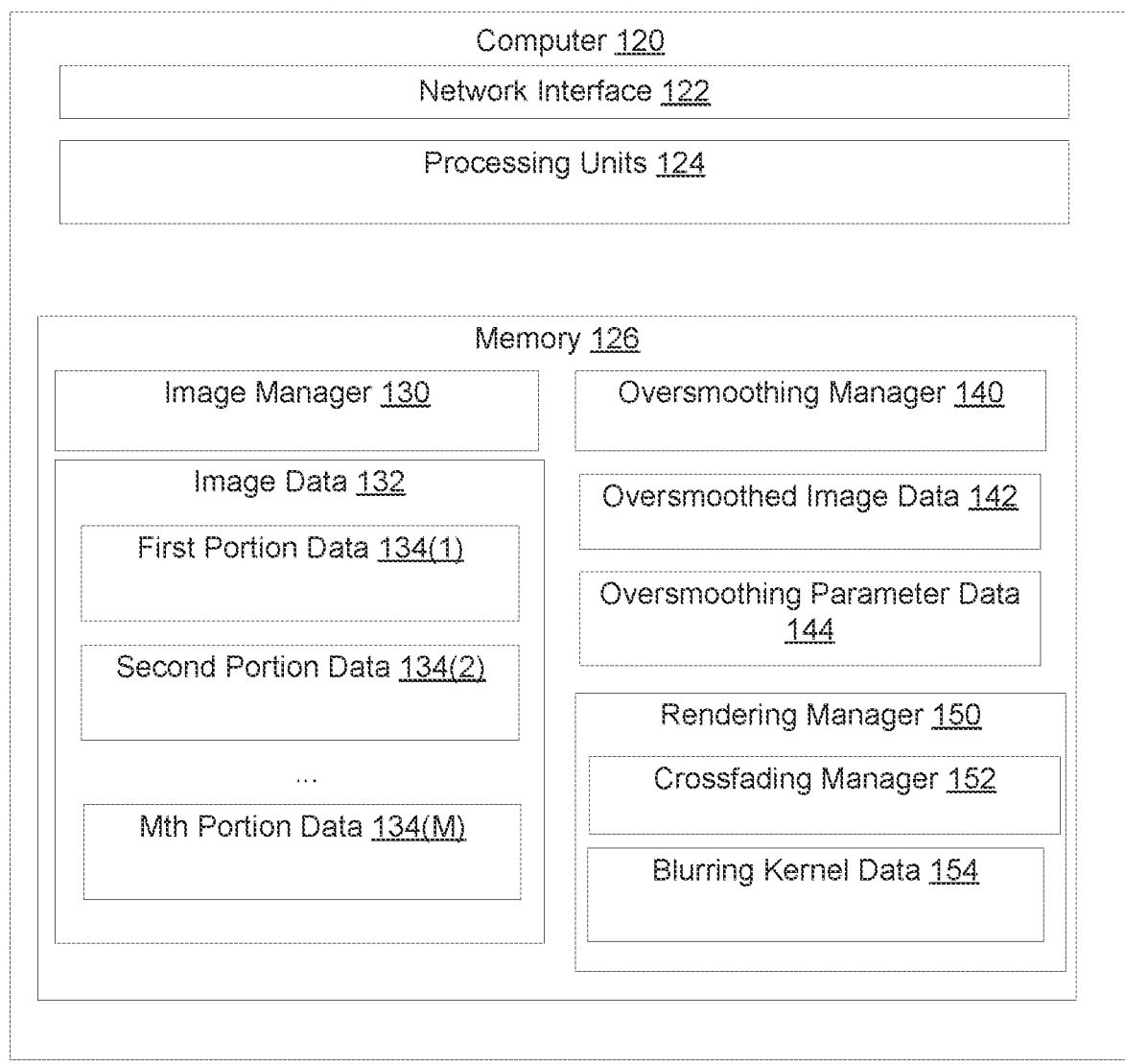
FIG. 1 is a diagram that illustrates an example electronic environment in which improved techniques described herein may be implemented.

A progressive encoded image (e.g., in JPEG format) may be considered as an equivalent to an interlaced GIF Graphics Interchange Format. For example, a progressive encoded JPEG may be image created using the JPEG suite of compression algorithms that will fade-in in successive waves of lines until the entire image has completely arrived.

A technical problem with progressive encoded JPEG has been that when previous versions contain artifacts that are corrected in future layers, some image features are present only in the preview. This means that, with a conventional progressive encoded JPEG, some new details appear while other features that possibly caught the eye of the viewer disappear. Particularly, a blocking structure is such a disappearing feature in simple progression. Such disappearing artifacts may interfere with the user experience because the disappearing features do not conform to users' expectations.

Moreover, with the JPEG image format, progressive images tend to be about 10% smaller and load otherwise faster, as progression allows a different entropy encoding to be used for different discrete cosine transform (DCT) coefficients. However, some progressive encoded JPEG images use increased processer and memory bandwidth.

In accordance with the implementations described herein, a technical solution to the above-described technical problem includes displaying an oversmoothed version of an image as the image data is being received. For example, rendering an oversmoothed image on a display and then rendering subsequent image layers over the oversmoothed image may be less disruptive to a user than a display of a final image on, e.g., a white background. The oversmoothed image may be smoothed according to a smoothing kernel, e.g., a convolution kernel (such as a Gaussian). The oversmoothed image is a first layer over which other image layers are displayed. It is noted that the oversmoothed image may present a recognizable version of the image to a user, including recognizable versions of various image features (e.g., persons, objects). As the other layers are rendered on the display, these image features remain visible to the user. That is, the image features are not artifacts that may disappear with the rendering of final image layers; this may occur with the conventional progressive encoded images and interferes with the user experience.

A technical advantage of disclosed implementations is that the above-described progressive encoded image loads very quickly, and it forms the basis of a less disruptive loading process. Moreover, the above-described progressive encoded image may load faster than the conventional progressive encoded image.

In some implementations, a client running a browser has a control parameter with a parameter specifying an amount of smoothing applied to progressive phases of an image. The value of this parameter may be defaulted to a high smoothing level to allow most websites to provide oversmoothed renderings can use normal progression to get faster websites implemented.

When the image has a progression that is configured for oversmoothing, e.g., when the DC groups are sent in the first phase, the receiving client computes the observed bandwidth of the user relative to remaining memory left for that image. If the remaining download time exceeds a specified time interval (e.g., one second), the client renders an oversmoothed version of the DC image while the rest of the image is loading.

The client computer displays the oversmoothed version while the AC part is loading. Loading the final image after we have showed the oversmoothed image is less disruptive than display the final image on top of a white background— the oversmoothed image can be loaded more quickly.

The client computer signals through different layers of the browser content encoding layers when we have enough data to draw the first preview. That way the client computer can render the first image earlier than in a use where the first analysis would be done when a certain percentage of the data is loaded.

During the loading the client computer may replace the oversmoothed version either from top-to-bottom order like normal sequential JPEGs are drawn on the background, or we can fade the AC into the oversmoothed version. This is favorable when the client computer has high graphics capabilities, but the bandwidth is relatively low in comparison to the image download size. Fading in the final image (relatively quickly) creates no flashes/flicker, i.e., distracts the viewer even less than going from oversmoothed to the final directly.

A maximally large smoothing parameter value is equivalent to a background color being used. A large smoothing yields, e.g., a 200 byte preview image. However, alternative solutions with much less smoothing will still be possible, giving more detail and a more responsive feeling are possible. Often with high quality images, about 6% of the image is needed to be able to show this first image. Given that a typical image is about 50 kB, the DC would average in practice to 3000 bytes, giving much finer definition than the 200 byte approach achieved with the large smoothing parameter value. Further, this extra data does not need to be sent at all—and no additional javascript and/or serverside infrastructure is needed to maintain the data. In addition to using the existing data, savings in the total transmitted size of the JPEG may be achieved while adding this feature. Moreover, this mode is compatible with progression modes of the JPEG XL standard.

In the implementation of the above-described technical solution, the DC image may be maintained in a one pixel per 8×8 block. That solves a common problem with progression, which roughly doubles the memory bandwidth requirements. Moreover, it allows less data to be transferred between the CPU and the GPU if GPU is used for the final oversmoothing.

FIG. 1 is a diagram that illustrates an example electronic environment 100 in which the above-described technical solution may be implemented. The electronic environment 100 includes a client computer 120 configured to perform image compression and decompression.

The computer 120 includes a network interface 122, one or more processing units 124, memory 126, and a display interface 128. The network interface 122 includes, for example, Ethernet adaptors, Token Ring adaptors, and the like, for converting electronic and/or optical signals received from the network 150 to electronic form for use by the computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some implementations, one or more of the components of the computer 120 can be, or can include processors (e.g., processing units 124) configured to process instructions stored in the memory 126. Examples of such instructions as depicted in FIG. 1 include an image manager 130, an oversmoothing manager 140, and a rendering manager 150. Further, as illustrated in FIG. 1, the memory 126 is configured to store various data, which is described with respect to the respective managers that use such data. Note that, in some implementations, an entity page corresponds to an offer page that includes an offer to sell a product.

The image manager 130 is configured to receive or acquire image data 132. In some implementations, the image manager 130 is configured to receive or acquire the image data 132 over the network interface 122, i.e., over a network (such as network 190) from the display device 170. In some implementations, the image manager 130 is configured to receive or acquire the image data 132 from local storage (e.g., a disk drive, flash drive, SSD, or the like).

The image data 132 represents a color image. The image data 132 includes a set of pixels, each of the set of pixels having a coordinate within the image and a set of numerical values, each of the set of numerical values representing a value within a color channel. In some implementations, the color channels used in the image data 132 are RBG, e.g., RGB data 133.

The image manager 130 is also configured to receive the image data 132 in portions, i.e., first portion 134(1), second portion 134(2), and so on until Mth portion 134(M). When the image data 132 is configured for oversmoothing, e.g., when the DC groups are sent in the first portion 134(1), the image manager 130 is configured to compute the observed bandwidth relative to remaining memory left for that image. In some implementations, if the remaining download time exceeds a specified time interval (e.g., one second), the client computer 120 (e.g., a rendering manager 150) renders an oversmoothed version of the first portion 134(1) while the rest of the image is loading.

An oversmoothing manager 140 is configured to perform an oversmoothing operation on the first portion 134(1) of the image data 132 to produce oversmoothed image data 142. In some implementations, the oversmoothing operation involves a convolution of the first portion 134(1) with a blurring kernel (e.g., blurring kernel data 154). In some implementations, the oversmoothing operation is controlled using oversmoothing parameter data 144, which takes the form of a real value indicating how much oversmoothing is to occur. In some implementations, when the convolution kernel is a Gaussian function, the oversmoothing parameter takes the form of a Gaussian width; a smaller value in this case indicates less smoothing.

The oversmoothed image data 142 represents the DC image resulting from the oversmoothing operation performed on the first portion 134(1) of the image. The oversmoothed image data 142 is, in some implementations, constructed using only a small (<10%) of the total image data 132. Despite the small amount of data, the oversmoothed image data 142, depending on the value of the oversmoothing parameter data 144, is in many cases a facsimile of the image recognizable to a user, including features such as human features, objects, and the like.

The rendering manager 150 is configured to perform a rendering operation on each image layer, e.g., representing a portion or portions 134(1), 134(2), . . . , 134(M). The rendering manager 150 is configured to render the image layers in such a way as to maintain the image features from the oversmoothed (first) image layer. That is, the first image layer does not include artifacts that may be removed upon further rendering. In this way, the image rendering process provides an improved user experience from a psychovisual perspective. As shown in FIG. 1, the rendering manager 150 includes, in some implementations, a crossfading manager 152.

The crossfading manager 152 is configured to perform crossfading operations on subsequent image layers (i.e., those corresponding to the second portion 134(2) and subsequent image portions). For example, an image may be split into blocks of, e.g., 8×8 pixels, as is done in computing DCT coefficients. Crossfading applies to integrating high-frequency image portions into a low-frequency background or first layer. In some implementations, the corner 2×2 sub-blocks of the 8×8 block are crossfaded into the background. In some implementations, when an image is arranged in an array of tiles, e.g., 256×256 tiles, the crossfading manager 152 is configured to perform a crossfading operation on a single tile to integrate that tile into the blurry background/layer. However, the crossfading manager 152 is also configured to not perform a crossfading operation on two tiles in succession.

The crossfading manager 152 is, in some implementations, configured to perform a linear interpolation between the blurred image and the final image. A weighting factor for the linear interpolation may depend on temporal and spatial location. For example, when a tile of finer resolution is ready for display, the borders of the tile may be kept cross-faded between the blurred and the finer resolution version of the tile—so that no sharp boundary appears in the image. The crossfading manager 152 may increase the weight of the finer resolution image gradually in time so that it does not appear as a rapid flash, but as a gradual effect.

In some implementations, corners (e.g., 2×2 corners) of the, e.g., 8×8 blocks may be filtered using an order-dependent filter such as the median filter. Another possibility for the corners of the blocks would be to calculate how far the values are from the average value and weight the furthest pixels the least, for example weighting the pixels by their inverse distance to the average or adding a small epsilon to that distance before inverting.

The crossfading can work with any chosen smoothing algorithm. The crossfading operation is, in some implementations, a convolution operation using a blurring kernel 154. Here, the blurring kernel 154 may also be a Gaussian, but its width may be smaller than that used for the oversmoothing operation.

Crossfading, as discussed above, may be a spatially and temporally variable linear interpolation between the sharp and the smooth representation of the image. In some implementations, when crossfading is animated different convolutions may be performed in between keyframes of the animations, i.e., sharper interpolations before moving to the next layer of sharpening.

In some implementations, smoothing is performed in frequency space. That is, the smoothing is performed on DCT coefficients. In other implementations the smoothing is done over pixels.

In some implementations the smoothing is performed using the GPU as well as the animations are performed using the GPU. In other implementations the smoothing is done by the CPU. When smoothing is done by the DCT space, in some implementations we would keep the smoother coefficients when new coefficients are loaded, and only replace those coefficients that have been transmitted. In some implementations, all smoothed coefficients are set to zero. In some implementations, another smoothing operation is performed to obtain a better set of DCT values for the not-yet-transferred coefficients.

The components (e.g., modules, processing units 124) of the user device 120 can be configured to operate based on one or more platforms (e.g., one or more similar or different platforms) that can include one or more types of hardware, software, firmware, operating systems, runtime libraries, and/or so forth. In some implementations, the components of the computer 120 can be configured to operate within a cluster of devices (e.g., a server farm). In such an implementation, the functionality and processing of the components of the computer 120 can be distributed to several devices of the cluster of devices.

The components of the computer 120 can be, or can include, any type of hardware and/or software configured to process attributes. In some implementations, one or more portions of the components shown in the components of the computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computer 120 can be, or can include, a software module configured for execution by at least one processor (not shown). In some implementations, the functionality of the components can be included in different modules and/or different components than those shown in FIG. 1, including combining functionality illustrated as two components into a single component.

Although not shown, in some implementations, the components of the computer 120 (or portions thereof) can be configured to operate within, for example, a data center (e.g., a cloud computing environment), a computer system, one or more server/host devices, and/or so forth. In some implementations, the components of the computer 120 (or portions thereof) can be configured to operate within a network. Thus, the components of the computer 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, one or more of the components of the computer 120 can be, or can include, processors configured to process instructions stored in a memory. For example, an image manager 130 (and/or a portion thereof), oversmoothing manager 140 (and/or a portion thereof), and rendering manager 150 (and/or a portion thereof) can be a combination of a processor and a memory configured to execute instructions related to a process to implement one or more functions.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the VR server computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the computer 120. As illustrated in FIG. 1, the memory 126 is configured to store various data, including image data 132, oversmoothed image data 142, and blurring kernel data 154.

Figure 2:
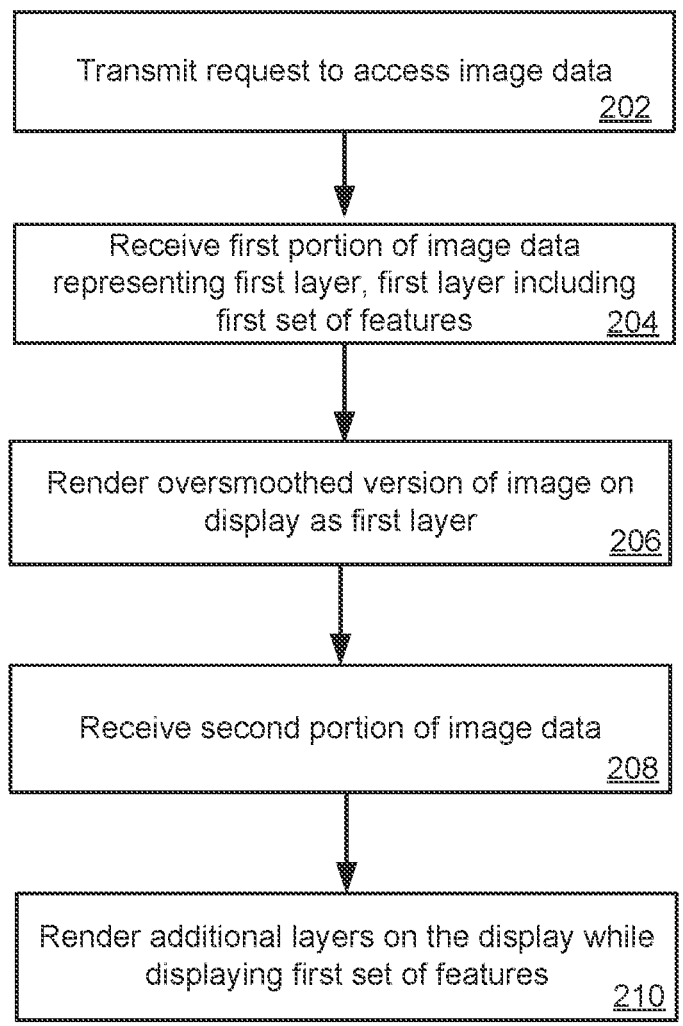
FIG. 2 is a flow chart that illustrates an example method of operating an augmented reality system, according to disclosed implementations.

FIG. 2 is a flow chart depicting an example method 200 of according to the above-described improved techniques. The method 200 may be performed by software constructs described in connection with FIG. 1, which reside in memory 126 of the computer 120 and are run by the set of processing units 124.

At 202, the image manager 130 transmits a request to access image data representing an image.

At 204, the image manager 130 receives, after transmitting the request a first portion of the image data, the first portion of the image data representing a first image layer, the first layer including a first set of features.

At 206, the oversmoothing manager 140 and rendering manager 150 render, as the first layer, an oversmoothed version of the image on a display associated with the client, the oversmoothed version of the image including more than one color.

At 208, the image manager 130 receives, after receiving the first portion of the image data to the client, a second portion of the image data, the second portion of the image data representing a set of additional image layers.

At 210, the rendering manager 150 renders the set of additional image layers on the display while displaying the first set of features of the first layer on the display.

Figure 3:
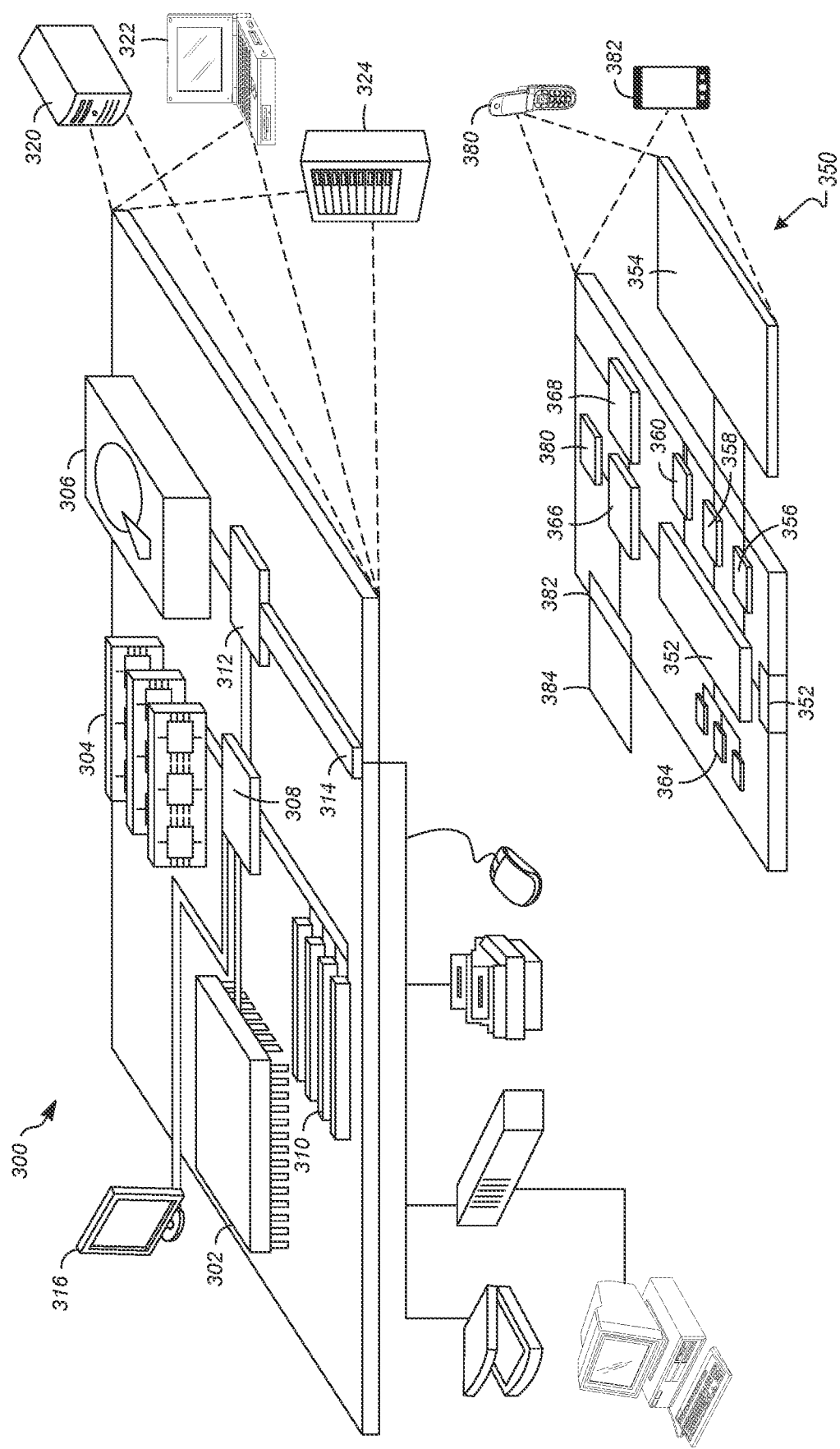
FIG. 3 is a diagram illustrating an example of a computer device and a mobile computer device that can be used to implement the described techniques.

FIG. 3 illustrates an example of a generic computer device 300 and a generic mobile computer device 350, which may be used with the techniques described here. Computer device 300 is one example configuration of computer 120 of FIG. 1

As shown in FIG. 3, computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high-speed controller 308 manages bandwidth-intensive operations for the computing device 300, while the low-speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising:
   transmitting, from a client, a request to access image data representing an image;
   after transmitting the request, receiving a first portion of the image data, the first portion of the image data representing a first layer including a set of features;
   in response to determining that a download time for receiving the image data satisfies a condition:
      rendering, as the first layer, a smoothed version of the image on a display associated with the client, the smoothed version of the image including more than one color; and
      while rendering the smoothed version of the image on the display associated with the client, receiving a second portion of the image data, the second portion of the image data representing a second layer; and
   rendering the second layer on the display while displaying the set of features of the first layer on the display.

2. The method as in claim 1, wherein the first layer is rendered over a set of image pixels of the image,
   wherein the set of features is a first set of features,
   wherein the second portion of the image data further includes a third layer, and
   wherein the method further comprises:
      rendering, as the second layer, a second set of features over a first subset of the set of image pixels; and
      rendering, as the third layer, a third set of features over a second subset of the set of image pixels.

3. The method as in claim 1, wherein the first layer is rendered over a set of image pixels of the image,
   wherein the set of features is a first set of features, and
   wherein the method further comprises:
      rendering, as the second layer, a second set of features over the first layer.

4. The method as in claim 3, wherein rendering the second set of features includes:
   performing a crossfading operation on a subset of the set of image pixels.

5. The method as in claim 4, wherein the crossfading operation includes a convolution operation with a specified blurring kernel.

6. The method as in claim 4, wherein the crossfading operation is applied to subblocks of blocks of pixels, the subblocks located at a corner of the blocks.

7. The method as in claim 1, wherein rendering the smoothed version of the image on the display includes:
   performing a smoothing operation to produce the smoothed version of the image according to a user-specified value of a smoothing parameter.

8. The method as in claim 1, wherein the condition is satisfied when the download time exceeds a time interval.

9. A computer program product comprising a nontransitive storage medium, the computer program product including code that, when executed by processing circuitry of a computing device, causes the processing circuitry to perform a method, the method comprising:
   transmitting, from a client, a request to access image data representing an image;
   after transmitting the request, receiving a first portion of the image data, the first portion of the image data representing a first layer including a set of features,
   in response to determining that a download time for receiving the image data satisfies a condition:
      rendering, as the first layer, a smoothed version of the image on a display associated with the client, the smoothed version of the image including more than one color; and
      while rendering the smoothed version of the image on the display associated with the client, receiving a second portion of the image data, the second portion of the image data representing a second layer; and
   rendering the second layer on the display while displaying the set of features of the first layer on the display.

10. The computer program product as in claim 9, wherein the first layer is rendered over a set of image pixels of the image,
    wherein the set of features is a first set of features,
    wherein the second portion of the image data further includes a third layer, and
    wherein the method further comprises:
       rendering, as the second layer, a second set of features over a first subset of the set of image pixels; and
       rendering, as the third layer, a third set of features over a second subset of the set of image pixels.

11. The computer program product as in claim 9, wherein the first layer is rendered over a set of image pixels of the image,
    wherein the set of features is a first set of features, and
    wherein the method further comprises:
       rendering, as the second layer, a second set of features over the first layer.

12. The computer program product as in claim 11, wherein rendering the second set of features includes:
    performing a crossfading operation on a subset of the set of image pixels.

13. The computer program product as in claim 12, wherein the crossfading operation includes a convolution operation with a specified blurring kernel.

14. The computer program product as in claim 12, wherein the crossfading operation is applied to subblocks of blocks of pixels, the subblocks located at a corner of the blocks.

15. The computer program product as in claim 9, wherein rendering the smoothed version of the image on the display includes:
    performing a smoothing operation to produce the smoothed version of the image according to a user-specified value of a smoothing parameter.

16. An electronic apparatus, the electronic apparatus comprising:
    memory; and
    controlling circuitry coupled to the memory, the controlling circuitry being configured to:
       transmit, from a client, a request to access image data representing an image;
       after transmitting the request, receive a first portion of the image data, the first portion of the image data representing a first layer, the first layer including a set of features, and
       in response to determining that a download time for receiving the image data satisfies a condition:

render, as the first layer, a smoothed version of the image on a display associated with the client, the smoothed version of the image including more than one color; and while rendering the smoothed version of the image on the display associated with the client, receive a second portion of the image data, the second portion of the image data representing a second layer; and render the second layer on the display while displaying the set of features of the first layer on the display.

17. The electronic apparatus as in claim 16, wherein the first layer is rendered over a set of image pixels of the image, wherein the set of features is a first set of features, wherein the second portion of the image data further includes a third layer, and wherein the controlling circuitry is further configured to:
render, as the second layer, a second set of features over a first subset of the set of image pixels; and
render, as the third layer, a third set of features over a second subset of the set of image pixels.

18. The electronic apparatus as in claim 16, wherein the first layer is rendered over a set of image pixels of the image, wherein the set of features is a first set of features, and wherein the controlling circuitry is further configured to:
rendering, as the second layer, a second set of features over the first layer.

19. The electronic apparatus as in claim 18, wherein the controlling circuitry configured to render the second set of features is further configured to:
perform a crossfading operation on a subset of the set of image pixels.

20. The electronic apparatus as in claim 19, wherein the crossfading operation includes a convolution operation with a specified blurring kernel.

21. The electronic apparatus as in claim 19, wherein the crossfading operation is applied to subblocks of blocks of pixels, the subblocks located at a corner of the blocks.

22. The electronic apparatus as in claim 16, wherein the controlling circuitry configured to render the smoothed version of the image on the display is further configured to:
perform a smoothing operation to produce the smoothed version of the image according to a user-specified value of a smoothing parameter.

* * * * *